(12) United States Patent
Patel et al.

(10) Patent No.: US 7,653,183 B2
(45) Date of Patent: Jan. 26, 2010

(54) METHOD AND APPARATUS TO PROVIDE DATA TO AN INTERACTIVE VOICE RESPONSE (IVR) SYSTEM

(75) Inventors: Labhesh Patel, San Francisco, CA (US); Sanjeev Kumar, San Francisco, CA (US); Ashish S. Chirputkar, Fremont, CA (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 11/278,903

(22) Filed: Apr. 6, 2006

(65) Prior Publication Data

US 2007/0263796 A1 Nov. 15, 2007

(51) Int. Cl.
*H04M 11/06* (2006.01)
(52) U.S. Cl. ............. 379/88.18; 340/539.1; 358/402; 370/389; 705/1; 707/6; 726/27
(58) Field of Classification Search ............. 379/88.01, 379/67.1, 88.14, 88.18; 348/42; 382/182; 704/275; 705/14, 1; 707/1, 6; 340/539.1; 358/402; 370/389; 726/27
See application file for complete search history.

(56) References Cited

U.S. PATENT DOCUMENTS

| | | | | |
|---|---|---|---|---|
| 6,020,980 A * | 2/2000 | Freeman | | 358/402 |
| 6,587,822 B2 * | 7/2003 | Brown et al. | | 704/275 |
| 6,625,600 B2 * | 9/2003 | Lyudovyk et al. | | 707/6 |
| 6,636,587 B1 * | 10/2003 | Nagai et al. | | 379/88.14 |
| 6,744,761 B1 * | 6/2004 | Neumann et al. | | 370/389 |
| 7,324,633 B2 * | 1/2008 | Gao et al. | | 379/88.18 |
| 7,454,794 B1 * | 11/2008 | Hibberd | | 726/27 |
| 7,460,652 B2 * | 12/2008 | Chang | | 379/88.18 |
| 7,522,038 B2 * | 4/2009 | Edwards et al. | | 340/539.1 |
| 2005/0185048 A1 * | 8/2005 | Ha | | 348/42 |
| 2006/0098874 A1 * | 5/2006 | Lev | | 382/182 |
| 2006/0116889 A1 * | 6/2006 | Hasebe et al. | | 705/1 |
| 2007/0050327 A1 * | 3/2007 | Roller et al. | | 707/1 |
| 2007/0156517 A1 * | 7/2007 | Kaplan et al. | | 705/14 |
| 2007/0165795 A1 * | 7/2007 | Haynor | | 379/88.01 |

\* cited by examiner

*Primary Examiner*—Gerald Gauthier
(74) *Attorney, Agent, or Firm*—Schwegman, Lundberg & Woessner, P.A.

(57) ABSTRACT

A method and system is described to provide data to an Interactive Voice Response (IVR) System. The method may comprise accessing an image communicated from a voice-communication device and communicating the image to an optical character recognition (OCR) module. Thereafter, data extracted from the image by the OCR module may be accessed and communicated for use in one or more IVR processes. The extracted data may be communicated to the device and confirmation that the extracted data corresponds to data in the image may be monitored. For example, the method may discover capabilities of the device to identify different communication options to communicate the image from the device. The options may be communicated to the device for presentation to a user. Upon receiving an indication of an option selected by the user, the IVR system may be configured to allow receipt of the image via the user selected option.

25 Claims, 7 Drawing Sheets

METHOD AND APPARATUS TO PROVIDE DATA TO AN INTERACTIVE VOICE RESPONSE (IVR) SYSTEM

FIELD

This application relates to a method and apparatus to provide data to an Interactive Voice Response (IVR) System.

BACKGROUND

Providing alphanumeric input to interactive voice response (IVR) systems tends to be difficult. For example, entering a vehicle's VIN number or even the name of a person using T9 text input in the middle of a telephone call is a challenging experience. Therefore, alphanumeric input is typically provided to an IVR system using speech that is recognized by Adaptive Speech Recognition. However, speech input is not secure for use in public places where there is a chance of being overheard, and speech recognition does also not work well in a noisy environment.

Financial IVR applications require users to enter information such as credit card and bank account numbers, a mother's maiden name, passwords, etc. Some of this secure information might be provided using speech input that renders the IVR application useless when the caller is in a public place (e.g., on a crowded train) where there is a chance of being over-heard. For example, if a person speaks out his credit card number over a phone in a train, then there is a chance that a fellow passenger with a good memory might memorize that number. DTMF input can be used to provide numerical data such as a credit card number securely, but having to enter a long string of digits and correcting for input errors is not a user friendly experience. The problem is especially pronounced for users with a physical handicap.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details.

Figure 1:
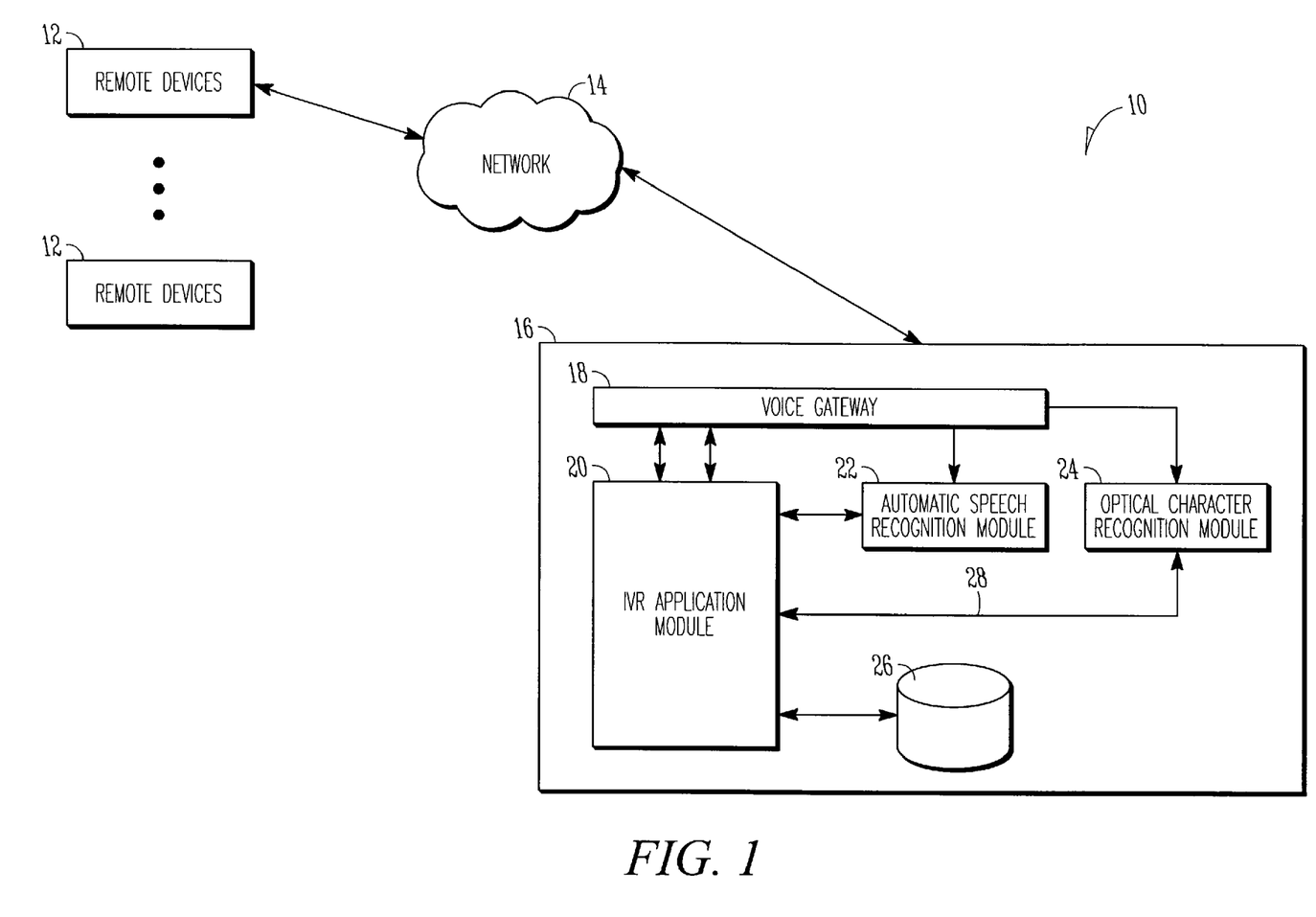
FIG. 1 shows a system, in accordance with an example embodiment, to provide data to an Interactive Voice Response (IVR) system.

Referring to FIG. 1, reference 10 generally indicates a system, in accordance with an example embodiment, to provide data to an Interactive Voice Response (IVR) system. The system 10 is shown to include a plurality of remote devices 12 which are connected via a network 14 to an IVR platform 16. The remote devices 12 may be remote voice communication devices such as cellular telephones, Voice over IP (VoIP) telephones (both mobile and desktop), or the like. For example, when the remote devices 12 are cellular telephones, the network 14 may be a cellular telephone network, and when the remote devices are VoIP telephones the network may be the Internet. The system 10 may, however, include a combination of cellular networks, the Internet, and any other communication network(s).

The IVR platform 16 is shown to include a voice gateway 18, an IVR application module 20, an Automatic Speech Recognition (ASR) module 22, an Optical Character Recognition (OCR) module 24, and a database 26. In use, a user of the remote device 12 may capture an image of an object (e.g. a financial card such as a credit card or any other bank card), and communicate the image to the IVR platform 16. The OCR module 24 of the IVR platform 16 may then perform optical character recognition on the image to obtain extracted or recognized data from the image which may then be fed into the IVR application module 20 (see line 28). Thus, in an example embodiment, OCR functionality may be combined with IVR functionality to allow an IVR system to process data in an image received via the system.

In an example embodiment, the system 10 may process a still image or photograph to extract relevant data from the image which is then fed in to the IVR application module 20. In an example embodiment, in addition to or instead of the capturing of still images, video streams may be accommodated by the system 10.

Figure 2:
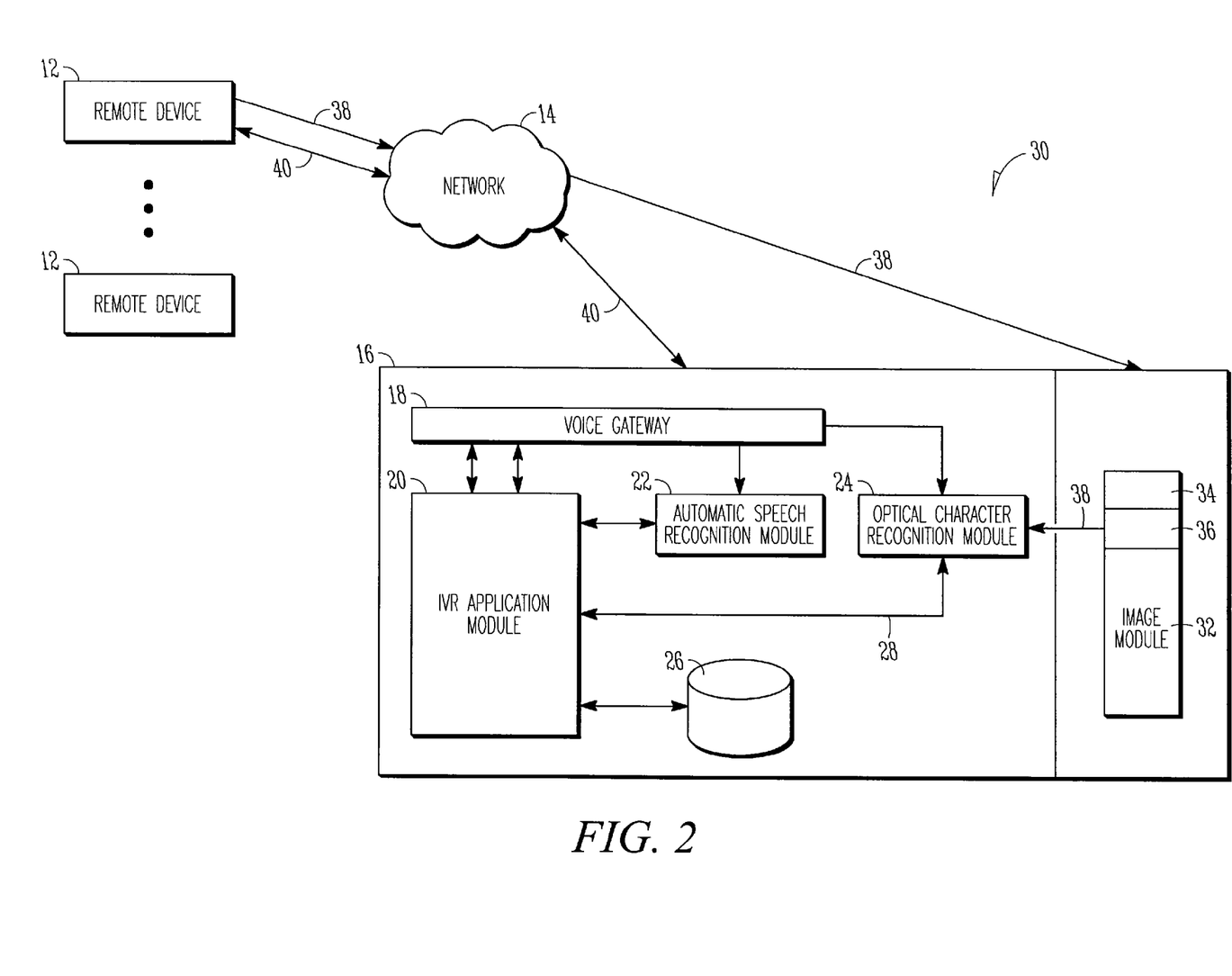
FIG. 2 shows a system, in accordance with an example embodiment, which includes an image module to receive a video stream from a remote voice communication device.

Referring in particular to FIG. 2, reference 30 generally indicates a system, in accordance with an example embodiment, which is configured to receive a video stream from a remote device 12 (see arrows 38) and capture an image from the video stream. The system 30 substantially resembles a system 10 and, accordingly, like reference numerals have been used to indicate the same or similar features. However, in the system 30, the IVR platform 16 includes an image module 32 that includes a video interface 34 for receiving a video stream from a remote device 12. The received video stream is then fed in to an image capture module 36 which extracts a single image from the video stream and feeds it into the OCR module 24 as shown by line 38. As in the case of a still image, the OCR module 24 may then perform optical character recognition on the image to extract data, which is then fed into the IVR application module 20. In an example embodiment, the systems 10, 30 are configured to receive images via a Short Message Service (SMS) message or a Multimedia Message Service (MMS) message. It will however be appreciated that any other technology or protocol may be used to receive an image from a remote device 12.

Figure 3:
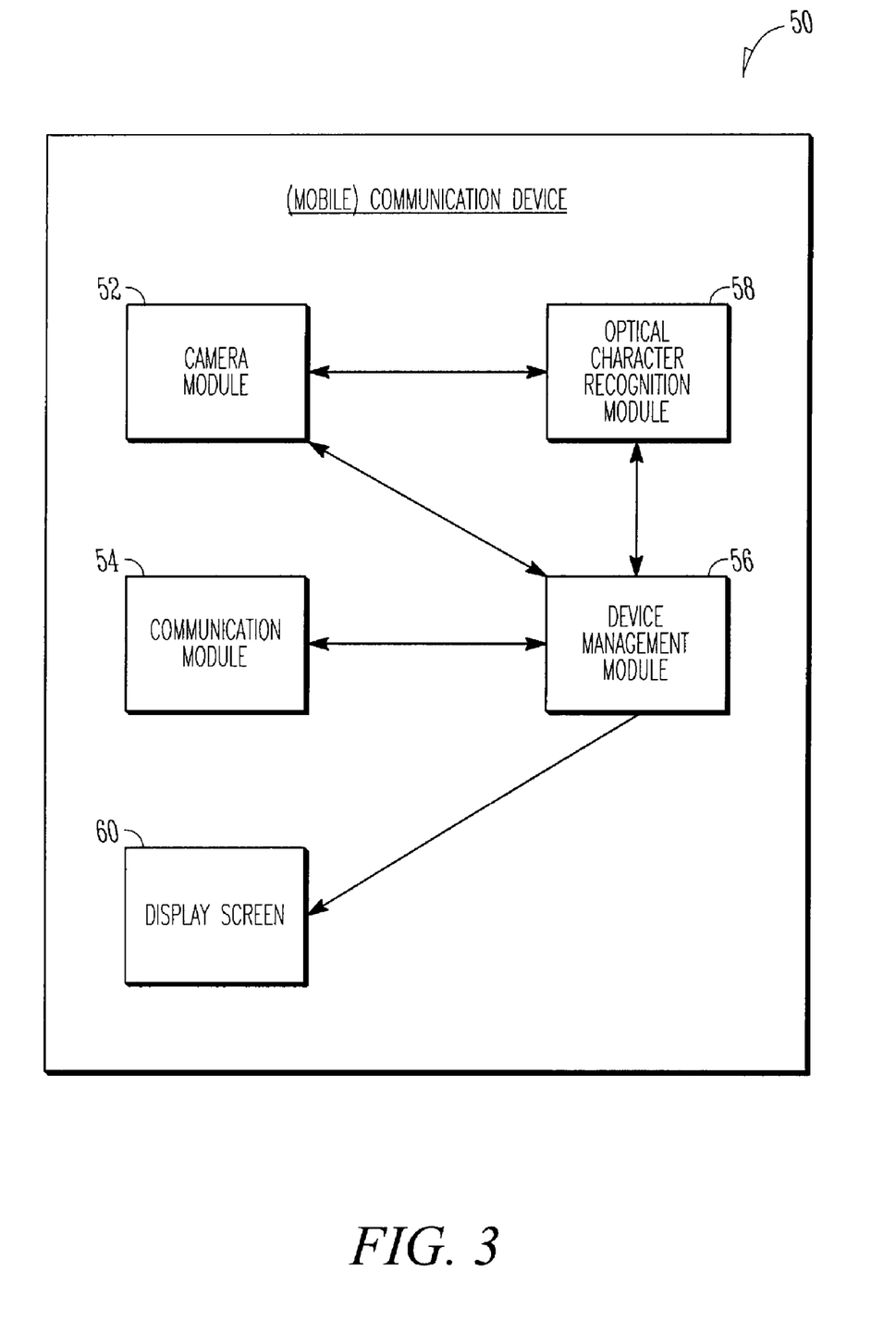
FIG. 3 shows a mobile communication device, in accordance with an example embodiment, to communicate extracted image data to an IVR system.

In the example systems 10, 30, OCR functionality is provided at the IVR platform 16. However, it will be appreciated that the OCR functionality may be provided at the remote device 12. Referring to FIG. 3, reference 50 generally indicates a communication device (e.g. a mobile communication device such as a cellular telephone) which includes a camera module 52, a communication module 54, and a device management module 56. The camera module 52, the communication module 54, and the device management module 56 may be substantially similar to those modules currently provided on cellular telephones. However, in addition to the aforementioned modules, the communication device 50 includes an OCR module 58. In use, a user may use the communication device 50 to take a picture of an object (e.g. a financial card, a driver's license, a VIN number on a motor vehicle, or any other letters or numerals (or combination thereof)) on an object. The captured image may then be fed in to the OCR module 58 where data is extracted and communicated via the communication module 54 to an IVR system and thus, accordingly, provide input to the IVR system for subsequent action. In an example embodiment, the extracted data may first be presented to the user on a display screen 60 of the mobile communication device 50. Thus, it will be appreciated that the Optical Character Recognition functionality may be performed either on the communication device 50 or at the IVR platform 16.

Figure 4:
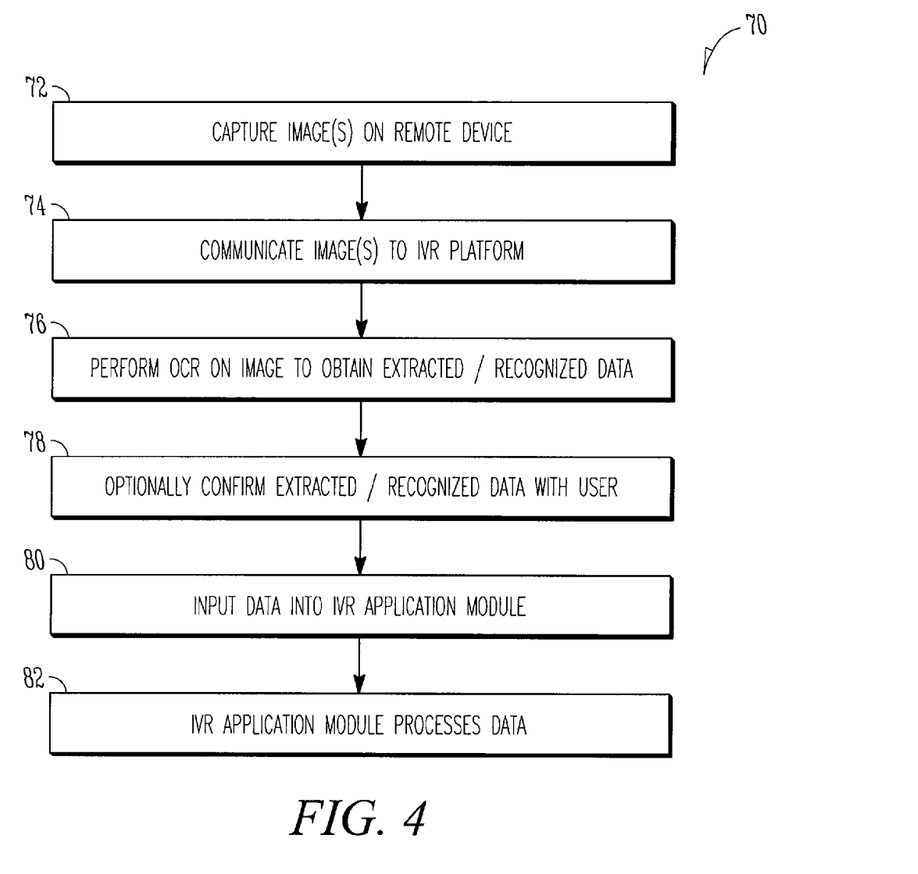
FIG. 4 shows a method, in accordance with an example embodiment, of providing data to an IVR system.

Referring to FIG. 4, reference 70 generally indicates a method, in accordance with an example embodiment, of providing data to an Interactive Voice Response (IVR) system. The method 70 may, for example, be performed on the IVR platform 16 (see FIG. 1) and, accordingly, is described by way of example with reference thereto. As shown at block 72, an image may be captured on a remote device (such as the remote device 12) and communicated to the IVR platform 16 (see block 74). When the remote device 12 is a cellular telephone, the method 70 may include communicating the image via a cellular telephone network to the IVR or platform 16. Thereafter, as shown at block 76, the method 70 performs optical character recognition on the image to obtain extracted or recognized data from the received image. Optionally, as shown at block 78, the method 70 may then communicate the extracted or recognized data back to the user of the remote device so that the user may confirm that the optical character recognition process accurately extracted the data. Functionality may then be provided to allow the user to either accept the extracted or recognized data or reject it. Once the user has confirmed that the extraction of the data is indeed correct, the data may then be fed into the IVR application module 20 as shown at block 80. Thereafter, the IVR application module 20 may process the data as required (see block 82).

For example, in an example banking environment, an IVR system may require the user to enter an account number or the like. Using the method 70, the user may take a snapshot or photograph of a banking card, credit card or the like and communicate the image to the IVR platform 16. The IVR platform 16, using its OCR module 24, may then extract an account number from the snapshot of the card. In an example embodiment, the IVR platform 16 then communicates the extracted data (account number in the given example) back to the user for confirmation. In the event of the user confirming the account number, the IVR application module 20 may then process the transaction. It will also be appreciated that the IVR application module 20 may be used to generate voice prompts or the like requesting the user to confirm the extracted data. The IVR application module 20 may then process the data and, for example, in the example banking scenario, may process the banking transaction. Thus functionality provided by the OCR module 24 and the IVR application module 20 may be integrated.

Figure 5:
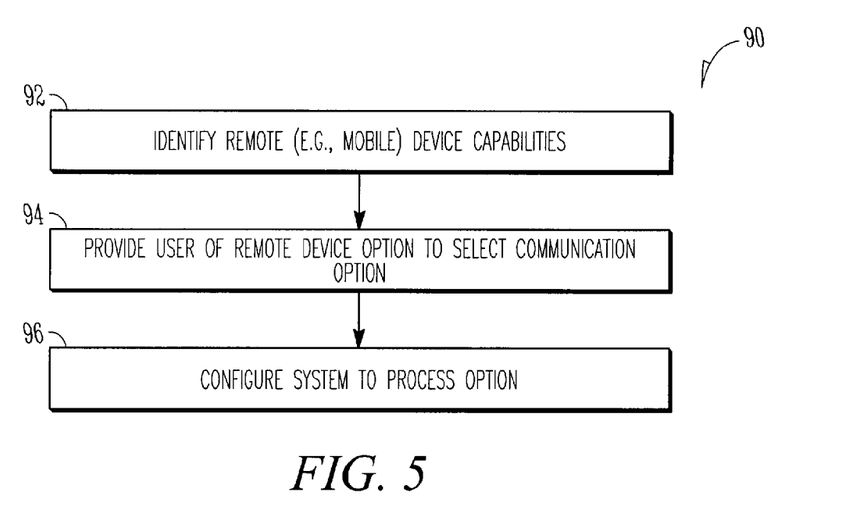
FIG. 5 shows a method, in accordance with an example embodiment, to identify device capabilities of a remote voice communication device.

In an example embodiment, the IVR platform 16 may discover or identify the capabilities of the remote device 12. Referring to FIG. 5, reference 90 generally indicates a method, in accordance with an example embodiment, to process remote device capabilities (e.g., the capabilities of a cellular telephone). As shown at block 92, the method 90 may identify remote device capabilities by, for example, communicating with the remote device, or consulting a database identifying the capabilities of the remote device. Thereafter, as shown at block 94, the method 90 may provide a user of the remote device an option to select one or more image communication options. The communication options may define the manner in which the user is desirous of communicating the image to the IVR platform 16.

The capabilities of the remote device that may be discovered may include a text capability, a video capability, a still image or photograph capability, a voice capability, or the like. Thus, in a public environment where a user may not be desirous of using a voice communication to interact with the IVR platform 16, the user may then select an image option and the user may then capture an image and communicate it to the IVR platform 16. Once the user has selected a particular communication option, the IVR platform 16 may configure the system 10 to process the selected option (see block 96). For example, as described in more detail below, the IVR platform 16 may open a new connection for the remote device 12 to communicate with. In an example embodiment, the remote device capabilities may include an indication of whether or not the remote device 12 has a display screen. If the remote device 12 does have a display screen, the IVR platform 16 may then, for example, communicate the extracted data to the remote device 12 so that the user may confirm that the OCR process was accurate.

Figure 6:
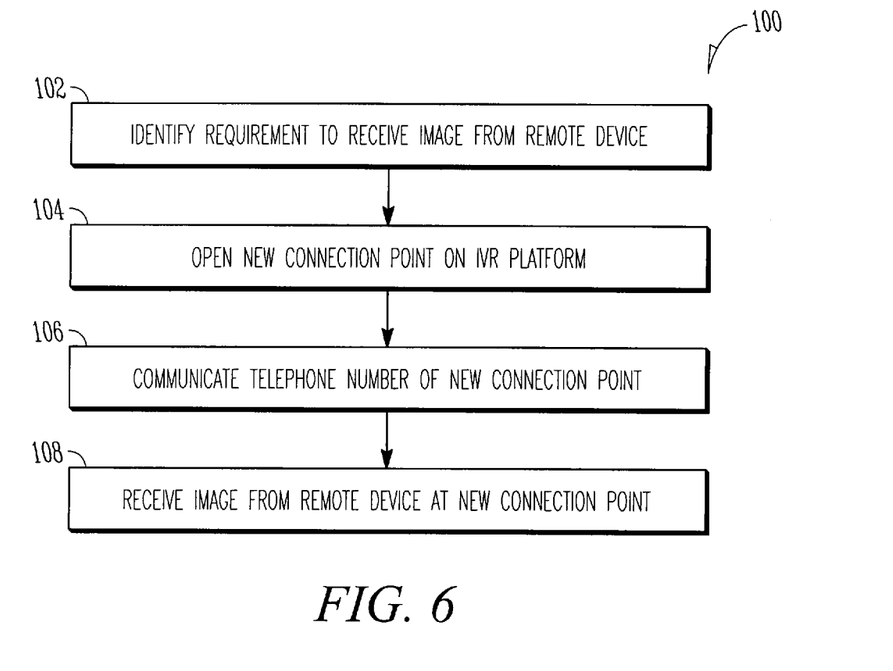
FIG. 6 shows a method, in accordance with an example embodiment, to communicate an image from a remote device such as a cellular telephone to an IVR platform.

Referring to FIG. 6, reference 100 generally indicates a method, in accordance with an example embodiment, to communicate an image from a remote device such as a cellular telephone to the IVR platform 16. As shown at block 102, the method 100 may identify a requirement to receive an image from the remote device (e.g., a remote device 12). For example, a user may dial into the IVR platform 16 and the IVR application module 20 may then present the user with a plurality of prompts. For example, the IVR application module 20 may ask a user "Do you want to communicate an image?" The user may then either respond by activating an appropriate key on the remote device or respond with an appropriate voice command (e.g. "Yes" or "No"). If in the given example the user answers in the affirmative, the IVR platform 16 may then open a new connection point (see block 104) with which the remote device 12 is to communicate. The IVR platform 16 may then also communicate a telephone number (alternate telephone number) of the new connection point to the remote device 12 with appropriate instructions (either verbal or in text) to the user to capture the image and communicate it to the alternate telephone number of the new connection point (see block 106). Thereafter, the user may take a snapshot or initiate a video feed of the object (e.g. a bank card or the like) and send the image to the IVR platform 16 via the alternate connection. Upon receipt of the image from the remote device 12 at the new connection point (see block 108), the IVR platform 16 may then perform optical character recognition on the image (see OCR module 24 in FIG. 2) and feed the extracted data into the IVR application module 20 for processing. In this given example, the image may be communicated to the IVR platform 16 in a communication channel that is separate from a voice communication channel (see arrows 40) initially used by the remote device to establish communications with the voice gateway 18 of the IVR platform 16. In an example embodiment, the image may be communicated via the alternate telephone number using an SMS message or a MMS message.

Figure 7:
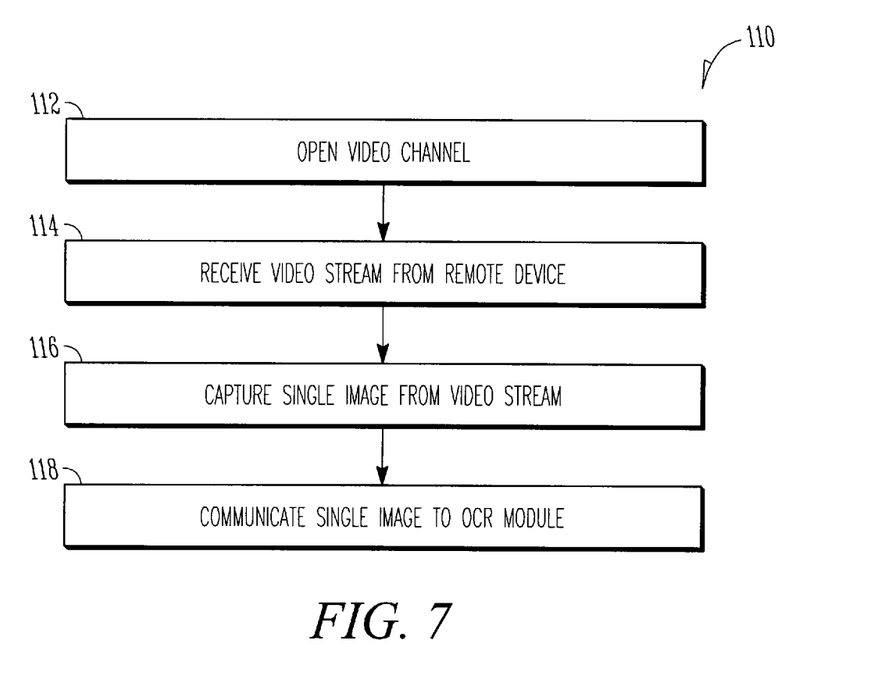
FIG. 7 shows a method, in accordance with an example embodiment, of receiving a video stream from a remote device.

In FIG. 7, reference 110 generally indicates a method, in accordance with an example embodiment, of receiving a video stream from a remote device such as the remote device 12. As shown at block 112, the IVR platform 16 may open a video channel which may then communicate with an image module (e.g. the image module 32 shown in FIG. 2). Thereafter, a video stream may be received from a remote device (e.g. a mobile cellular telephone) as shown at block 114 via a video interface (e.g. the video interface 34 shown in FIG. 2). A single image may be captured from the video stream as shown at block 116. The single image may then be communicated to an OCR module (se block 118,) to perform optical character recognition to derive extracted data, which is then feed into an IVR application module (e.g., the IVR application module 20). The communications between the remote device and the IVR platform may be encrypted.

In example embodiment, a separate communication channel may be established to communicate an image or video stream from the remote device 12 to the IVR platform 16. However, a single communication channel may be used to communicate the image. For example, the same voice communication channel that establishes a connection between the remote device 12 and the voice gateway 18 may be used.

Figure 8:
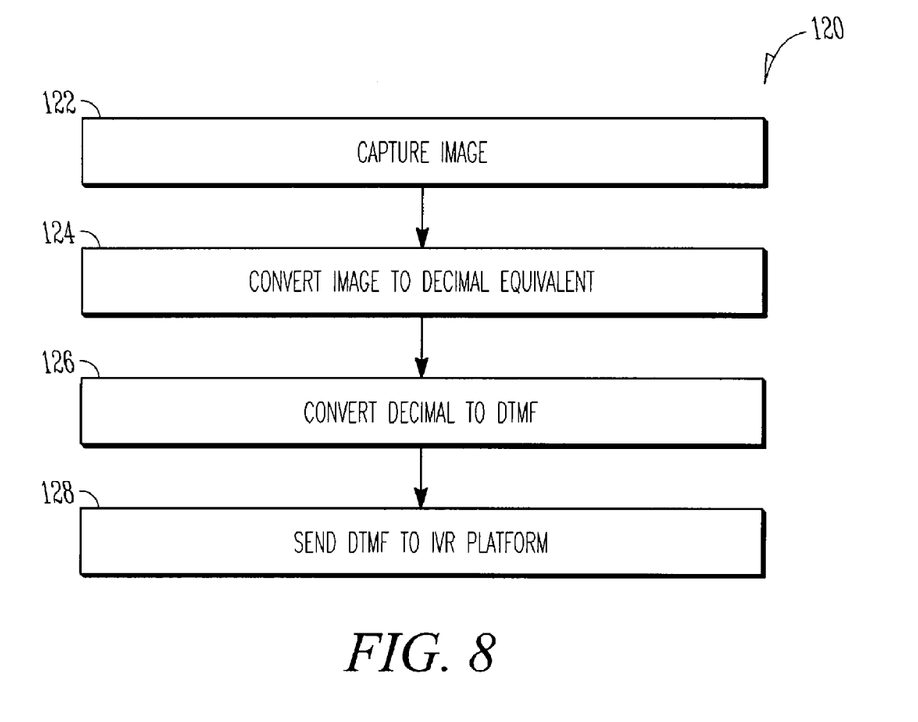
FIG. 8 shows a method, in accordance with an example embodiment, of encoding extracted image data at a remote voice communication device for communication to an IVR system.

In FIG. 8, a method 120, in accordance with an example embodiment, is shown of encoding extracted image data at a remote voice communication device for communication to an IVR system. As shown at block 122, the remote device (e.g. the remote device 12) may capture an image of an object (e.g. a financial card or the like) and convert the image into a decimal format or equivalent as shown at block 124. Thereafter, as shown at block 126, the method 120 may convert the decimal image to Dual Tone Multi-Frequency (DTMF) tones which are then communicated to the IVR platform 16 (see block 128). As will be familiar with a person of skill in the art, DTMF technology assigns a specific frequency (e.g. two separate tones) to each key on a keypad so that it can easily be identified by a device receiving the tones.

Figure 9:
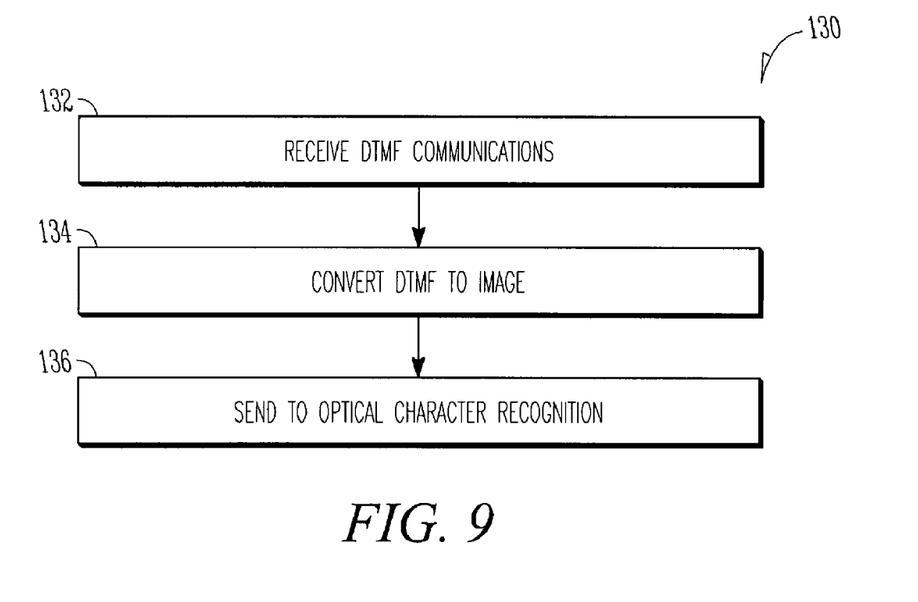
FIG. 9 shows a method, in accordance with an example embodiment, of decoding extracted image data at an IVR system.

FIG. 9 shows a method 130, in accordance with an example embodiment, of decoding extracted image data at an IVR system. As shown at block 132, an IVR platform (e.g., the IVR platform 16) may receive DTMF communications from a remote device (e.g., the remote device 12) and convert them to an image (see block 134). Thereafter, as shown at block 136, optical character recognition may be performed on the image to extract data which is then communicated into an IVR application module (e.g. the IVR application module 20).

Thus, in an example embodiment, a camera on cell-phone and/or video-phone (including a desktop phone) may provide input securely to an IVR system in a manner that cannot be overheard. In an example embodiment, the IVR platform 16 may use standard communications to detect capabilities of the endpoint or remote phone. For example, if the IVR platform 16 detects that the remote device 12 is a camera enabled video phone (such as an IP-based video phone), then the IVR platform 16 may open a video channel as described above with reference to FIG. 7. The user may be provided with an option to activate capture of the image by pressing a key (e.g., "#" sign) on the remote device 12.

The IVR platform 16 may prompt the user to "snap" a picture of the object (e.g., financial card, document or the like) and use a MMS message to send it to the number given by the IVR platform 16. If, for example, a cellular phone does not allow the user to operate its camera while on a call then the user may put the first call on hold, send the picture via MMS, and then resume the call with the IVR platform 16. In an example banking environment, on confirmation from the user, an extracted credit card number may be passed on to an application script (e.g., a VXML script) as a user input for a further application specific action.

In an example embodiment, a user may send pictures of entire documents through the camera using a video stream and optical character recognition may then be performed on the video. This may avoid a necessity to fax documents to a call center.

The image of the document that is received may go to an OCR application and not to any human agent. This image may then be discarded after optical character recognition has been performed on it. However, the image may be stored in a secure database.

Figure 10:
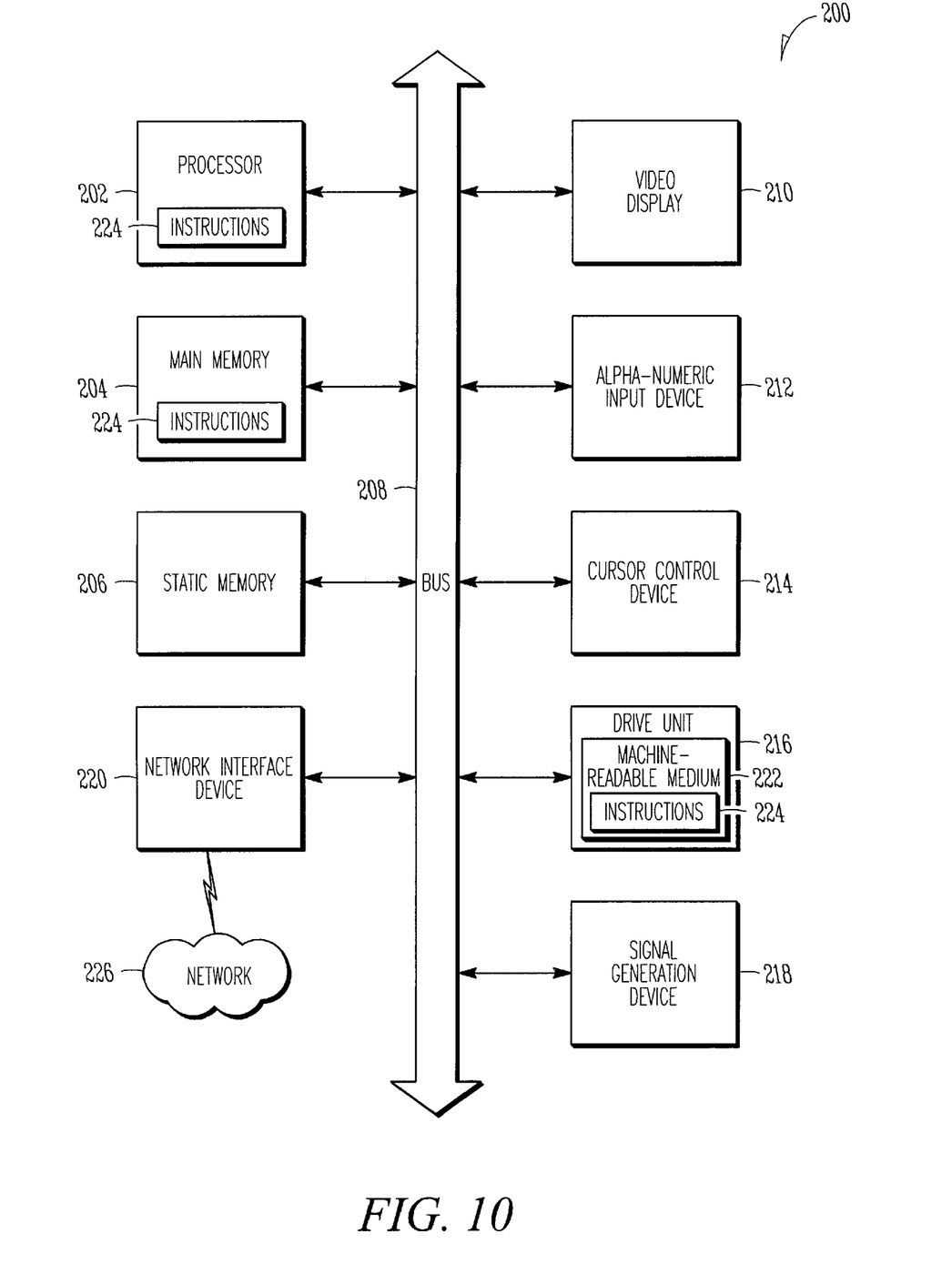
FIG. 10 shows a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 200 within which a set of instructions, for causing the machine to perform any one or more of the methodologies discussed herein, may be executed. It will be appreciated that some of the components of the computer system 200 may be omitted in different embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. One or more components of the machine may be a personal computer (PC), a tablet PC, a set-top box (STB), a Personal Digital Assistant (PDA), a cellular telephone, a web appliance, a network router, switch or bridge, a port card, a line card, a service card or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method for providing input to an interactive voice response (IVR) system, the method comprising:
   accessing, at the IVR system, an image communicated from a voice-communication device;
   communicating the image to an optical character recognition (OCR) module;
   accessing data extracted from the image by the OCR module; and
   communicating the extracted data for use in one or more IVR processes.

2. The method of claim 1, wherein the IVR system comprises the OCR module.

3. The method of claim 1, further comprising communicating the extracted data to the voice-communication device for confirmation that the extracted data is correct.

4. The method of claim 1, further comprising:
   identifying device capabilities of the voice-communication device; and
   communicating the extracted data to the voice-communication device in a format based on the device capabilities.

5. The method of claim 1, further comprising:
   discovering capabilities of the voice-communication device to identify a plurality of different communication options to communicate the image from the voice-communication device;
   communicating the options to the voice-communication device for presentation to a user;
   receiving an indication from the voice-communication device of an option selected by the user; and
   enabling receipt by the IVR system of the image via the option selected by the user.

6. The method of claim 1, further comprising:
   receiving a call from the voice-communication device;
   communicating at least one voice prompt to the voice-communication device, the voice prompt providing a user one or more options for communicating the image from the voice-communication device; and
   determining an option selected by the user.

7. The method of claim 6, further comprising:
   communicating to the voice-communication device a telephone number to which the voice-communication device can communicate the image; and
   determining whether the voice communication device has communicated the image to the telephone number.

8. The method of claim 7, wherein the voice-communication device communicated the image using one or more Short Message Service (SMS) messages.

9. The method of claim 1, wherein the voice-communication device communicated the image using a video stream.

10. The method of claim 1, wherein the voice-communication device communicated the image using one or more Dual Tone Multi-Frequency (DTMF) tones.

11. A machine-readable medium for storing a sequence of instructions for providing input to an interactive voice response (IVR) system, which, when executed by a machine, cause the machine to:
    access, at the IVR system, an image communicated from a voice-communication device;
    communicate the image to an optical character recognition (OCR) module;
    access data extracted from the image by the OCR module; and
    communicate the extracted data for use in one or more IVR processes.

12. The machine-readable medium of claim 11, wherein the IVR system comprises the OCR module.

13. The machine-readable medium of claim 11, further operable to communicate the extracted data to the voice-communication device for confirmation that the extracted data is correct.

14. The machine-readable medium of claim 11, further operable to:
    identify device capabilities of the voice-communication device; and
    communicate the extracted data to the voice-communication device in a format based on the device capabilities.

15. The machine-readable medium of claim 11, further operable to:
    discover capabilities of the voice-communication device to identify a plurality of different communication options to communicate the image from the voice-communication device;
    communicate the options to the voice-communication device for presentation to a user;
    receive an indication from the voice-communication device of an option selected by the user; and
    enable receipt by the IVR system of the image via the option selected by the user.

16. The machine-readable medium of claim 11, further operable to:
    receive a call from the voice-communication device;
    communicate at least one voice prompt to the voice-communication device, the voice prompt providing a user one or more options for communicating the image from the voice-communication device; and
    determine an option selected by the user.

17. The machine-readable medium of claim 16, further operable to:
    communicate to the voice-communication device a telephone number to which the voice-communication device can communicate the image; and
    determine whether the voice communication device has communicated the image to the telephone number.

18. The machine-readable medium of claim 17, wherein the voice-communication device communicated the image using one or more Short Message Service (SMS) messages.

19. The machine-readable medium of claim 11, wherein the voice-communication device communicated the image using a video stream.

20. The machine-readable medium of claim 11, wherein the voice-communication device communicated the image using one or more Dual Tone Multi-Frequency (DTMF) tones.

21. A computer-implemented system for providing input to an interactive voice response (IVR) system, the system comprising:
- means for accessing an image communicated from a voice-communication device;
- means for communicating the image to an optical character recognition (OCR) module;
- means for accessing data extracted from the image by the OCR module; and
- means for communicating the extracted data for use in one or more IVR processes.

22. A system for providing input to an interactive voice response (IVR) system, the system comprising:
- a voice-communication device remote from the IVR system, the voice-communication device being operable to capture an image and communicate the image to the IVR system; and
- the IVR system, operable to access the image, communicate the image to an optical character recognition (OCR) module, access data extracted from the image by the OCR module, and use the extracted data in one or more IVR processes associated with one or more IVR sessions between the voice communication device and the IVR system.

23. The system of claim 22, which is operable to:
- discover capabilities of the voice-communication device to identify a plurality of different communication options to communicate the image from the voice-communication device;
- communicate the options to the voice-communication device for presentation to a user;
- receive an indication from the voice-communication device of an option selected by the user; and
- enable receipt by the IVR system of the image via the option selected by the user.

24. The system of claim 22, wherein the IVR system is operable to receive the image via a Short Message Service (SMS) message or a Multimedia Message Service (MMS) message.

25. The system of claim 22, which is operable to:
- receive Dual Tone Multi-Frequency (DTMF) tones from the voice-communication device at the IVR system, the DTMF tones including image data; and decode the received DTMF tones to generate the image for optical character recognition.

* * * * *

UNITED STATES PATENT AND TRADEMARK OFFICE
CERTIFICATE OF CORRECTION

PATENT NO.       : 7,653,183 B2                                         Page 1 of 1
APPLICATION NO. : 11/278903
DATED            : January 26, 2010
INVENTOR(S)      : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this

Twenty-eighth Day of December, 2010

David J. Kappos
*Director of the United States Patent and Trademark Office*